United States Patent
Corvinelli et al.

(10) Patent No.: US 7,461,050 B2
(45) Date of Patent: Dec. 2, 2008

(54) METHODS OF COST ESTIMATION USING PARTIALLY APPLIED PREDICATES

(75) Inventors: Vincent Corvinelli, Mississauga (CA); John Frederick Hornibrook, Markham (CA); Bingjie Miao, Tigard, OR (US)

(73) Assignee: International Business Machines Corporation, Armonk, NY (US)

(*) Notice: Subject to any disclaimer, the term of this patent is extended or adjusted under 35 U.S.C. 154(b) by 201 days.

(21) Appl. No.: 11/278,088

(22) Filed: Mar. 30, 2006

(65) Prior Publication Data

US 2007/0233637 A1    Oct. 4, 2007

(51) Int. Cl.
    *G06F 17/30* (2006.01)
(52) U.S. Cl. ............................ 707/2; 707/3
(58) Field of Classification Search .............. 707/2, 707/1, 3
    See application file for complete search history.

(56) References Cited

U.S. PATENT DOCUMENTS

| | | | |
|---|---|---|---|
| 4,956,774 A | 9/1990 | Shibamiya et al. | |
| 5,469,568 A | 11/1995 | Schiefer et al. | |
| 5,761,653 A * | 6/1998 | Schiefer et al. | 707/2 |
| 5,995,957 A | 11/1999 | Beavin et al. | |
| 6,272,487 B1 | 8/2001 | Beavin et al. | |
| 6,738,755 B1 | 5/2004 | Freytag et al. | |
| 2007/0043697 A1* | 2/2007 | Driesch et al. | 707/2 |
| 2007/0198439 A1* | 8/2007 | Shriraghav et al. | 705/400 |

OTHER PUBLICATIONS

P.J. Hass and L. Stokes, "Estimating the Number of Classes in a Finite Population", J. Amer. Statist. Assoc., 93, 1998, pp. 1475-1487.

* cited by examiner

*Primary Examiner*—John Cottingham
*Assistant Examiner*—Alexandria Y Bromell
(74) *Attorney, Agent, or Firm*—Sughrue Mion, PLLC (57) ABSTRACT

In accordance with aspects of the present invention, provided are methods for incrementally estimating the cardinality of a derived relation including statistically correlated partially applicable predicates for a range-partitioned table. During the generation of a QEP a cardinality estimate is calculated in which one or more partially applicable predicates is correlated to another partially applicable predicate and/or to one or more fully applicable predicates. The cardinality includes a number of rows expected to be returned by the QEP and is computed in an incremental fashion for each operator of the QEP.

9 Claims, 6 Drawing Sheets

METHODS OF COST ESTIMATION USING PARTIALLY APPLIED PREDICATES

FIELD OF THE INVENTION

The present invention generally relates to database management systems, and in particular to methods of cost estimation using partially applied predicates.

BACKGROUND OF THE INVENTION

Information stored in a relational database may be accessed by using a query that specifies the information sought. To that end, Structured Query Language (SQL) is a standardized language used to define queries as a combination of one or more statements. Relational Database Management System (RDBMS) software often includes an SQL interface and a query optimizer for translating SQL statements into an efficient Query Execution Plan (QEP). A QEP defines the methods and sequences used for accessing tables, the placement of sorts, where predicates are applied, and so on. That is, a QEP specifies a plan for accessing the information sought.

Given the size and complexity of many relational databases, there may be many feasible alternative QEP's, even for a simply query. Accordingly, it is the role of the query optimizer to determine the best of the alternatives by modeling the execution characteristics of each one and choosing a single QEP that most closely satisfies some optimization goal. For example, the query optimizer may choose to minimize some estimated cost metric, such as resource consumption or elapsed time. A common factor considered in the computation of many types of cost estimates is a cardinality estimate. A cardinality estimate is an approximation of the number of rows in a table that will have to be searched for a particular QEP or a particular stage of a QEP. Basic cardinality estimation assumes that predicates are independent and values in a table are uniformly distributed.

U.S. Pat. No. 4,956,774 issued September 1990 to Shibamiya et al. discloses a method of determining and maintaining frequency statistics, thereby permitting the assumption of uniformity to be dropped. However, the possibility of statistical correlation between predicates was not addressed.

U.S. Pat. No. 5,469,568 issued November 1995 to Schiefer et al. discloses a method for computing cardinalities of joins (i.e. a multi-table) only when the join predicates were completely redundant, but did not address local (i.e. single-table) predicates and predicates with a correlation somewhere between completely redundant and completely independent. The application of multiple predicates may reduce the output stream cardinality. However, if predicates are statistically correlated, the combined filtering effect of the predicates is not simply the product of the individual filtering effects for the respective predicates. Assuming that predicates are independent (i.e. to assume no correlation) will result in an underestimate of the cardinality resulting from the application of multiple predicates.

U.S. Pat. No. 6,738,755 issued May 2004 to Freytag et al. discloses a method for incrementally estimating the cardinality of a derived relation when statistically correlated predicates are fully applied. However, Freytag et al did not disclose a method of estimating the cardinality resulting from the application of one or more partially applied predicates.

The problems of statistical correlation between predicates also apply to partially applied predicates, which may be applied against range-partitioned tables. However, partially applied predicates introduce new challenges that are not accounted for in the methods disclosed by Freytag et al. For example, a first challenge is that multiple partially applied predicates may be statistically correlated; and, a second challenge is that partially applied predicates may be statistically correlated to fully applied predicates. Previous methods of handling correlation between predicates do not provide an accurate cardinality estimate when one or more predicates are partially applied in a range-partitioned table.

SUMMARY OF THE INVENTION

Embodiments of the present invention are directed to a method for estimating the cardinality resulting from the application of one or more partially applied predicates against a range-partitioned table of a database. According to an exemplary embodiment of the invention, the method comprising: identifying at least one key column, wherein the at least one key column at least partially defines one or more data partitions in the range-partitioned table; calculating at least one combination of partially applicable predicates; and, calculating the partial selectivities for the at least one combination of partially applicable predicates.

In accordance with some aspects of the invention, the method also includes calculating a corresponding set of partial adjustments for the at least one combination of partially applicable predicates.

In accordance with some aspects of the invention, the method further comprises: computing an expected value, $cc(B|A)$, of the number of rows per partition after a first predicate has been partially applied; computing boundary values of $cc(B|A)$, $cc(B|A)_{min}$ and $cc(B|A)_{max}$; determining whether or not the expected value of $cc(B|A)$, is within the boundary values; choosing one of the two boundary values $cc(B|A)_{min}$ and $cc(B|A)_{max}$ to replace $cc(B|A)$ if $cc(B|A)$ is outside of the boundary values; choosing the computed $cc(B|A)$ if $cc(B|A)$ is within the boundary values; and, computing a partial selectivity corresponding to $cc(B|A)$ as one over the value of $cc(B|A)$.

In accordance with some aspects of the invention, the method further includes: determining whether or not a particular predicate can be partially applied to achieve a useful result; and, computing a corresponding partial selectivity value for the particular predicate, if the particular predicate can be partially applied.

In accordance with some aspects of the invention, the method also includes identifying partially applicable predicates as those predicates that are used to partition the range-partitioned table and not used to define an index for the range-partitioned table.

Other aspects and features of the present invention will become apparent, to those ordinarily skilled in the art, upon review of the following description of the specific embodiments of the invention.

BRIEF DESCRIPTION OF THE DRAWINGS

For a better understanding of the present invention, and to show more clearly how it may be carried into effect, reference will now be made, by way of example, to the accompanying drawings, which illustrate aspects of embodiments of the present invention and in which.

DETAILED DESCRIPTION OF THE INVENTION

Assuming that predicates are independent (i.e. to assume no correlation) will result in an underestimate of the cardinality resulting from the application of multiple predicates. If predicates are statistically correlated, the combined filtering effect of the predicates is not simply the product of the individual filtering effects for the respective predicates. The problems of statistical correlation between predicates also apply to partially applied predicates, which may be applied against range-partitioned tables. However, partially applied predicates introduce new challenges that are not accounted for in the methods disclosed by Freytag et al. For example, a first challenge is that multiple partially applied predicates may be statistically correlated; and, a second challenge is that partially applied predicates may be statistically correlated to fully applied predicates. Previous methods of handling correlation between predicates do not provide an accurate cardinality estimate when one or more predicates are partially applied against a range-partitioned table.

By contrast, in accordance with aspects of the present invention, provided are methods, systems, and computer program products for incrementally estimating the cardinality of a derived relation including statistically correlated partially applicable predicates for a range-partitioned table. During the generation of a QEP a cardinality estimate is calculated in which one or more partially applicable predicates is correlated to another partially applicable predicate and/or to one or more fully applicable predicates. The cardinality includes a number of rows expected to be returned by the QEP and is computed in an incremental fashion for each operator of the QEP.

Figure 1:
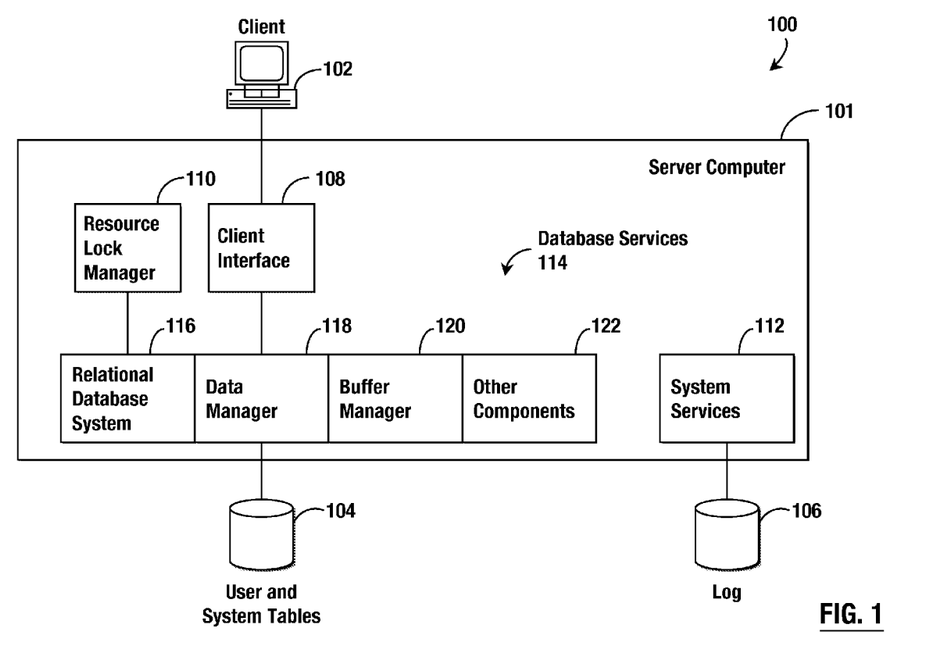
FIG. 1 is a schematic diagram of an example computer hardware environment suitable for use with aspects of the invention.

Referring to FIG. 1, shown is a simplified schematic drawing of an example computer hardware environment, generally indicated by 100, suitable for use with aspects of the invention. The computer hardware environment 100 includes a server computer 101, a client computer 102, user and system tables 104 and a system log 106. Although only one client computer 102 is illustrated, any number of client network nodes/computers may be provided in alternative embodiments.

The server computer 101 includes a Relational Database Management System (RDBMS) and a client interface 108. The client computer 102 interfaces to the RDBMS via the client interface 108. In operation the server computer 101 executes RDBMS that manages the user and system tables 104 and system log 106. The RDBMS includes a number of modules including a Resource Lock Manager (RLM) 110, a Systems Services Module 112, and the Database Services Module 114.

A RDBMS is generally designed to treat data as a shared resource, thereby permitting a number of users to access the data simultaneously. Accordingly, concurrency control is desirable to isolate users and maintain data integrity. To that end, the RLM 110 is provided to handle locking services for isolating users and maintaining data integrity.

The Systems Services Module 112 controls the overall RDBMS execution environment, including managing the system log 106, gathering statistics, handling startup and shutdown, and providing management support.

The Databases Service Module 114 includes several sub-modules including a Relational Database System (RDS) 116, Data Manager 118, Buffer Manager 120, and other components 122 such as an SQL compiler/interpreter. These sub-modules support the function of the SQL language (e.g. query definition, access control, retrieval and update, etc.).

In some very specific embodiments of the invention, a Relational Database Management System (RDBMS) comprises the DB2® Universal Database™ product offered by IBM® Corporation. However, those skilled in the art will appreciate that the present invention may be applied to any RDBMS.

Generally, the RDBMS includes logic and/or data that is embodied in or retrievable from a device, medium, or carrier (e.g. a fixed or removable data storage device, a remote device coupled to the computer by a data communications device, etc.). Moreover, this logic and/or data, when read, executed, and/or interpreted by the server computer 101, causes the server computer 101 to perform method steps provided in accordance with aspects of the invention and described in detailed below.

Aspects of the invention may be embodied in a number of forms. For example, various aspects of the invention can be embodied in a suitable combination of hardware, software and firmware. In particular, some embodiments include, without limitation, entirely hardware, entirely software, entirely firmware or some suitable combination of hardware, software and firmware. In a preferred embodiment, the invention is implemented in software, which includes but is not limited to firmware, resident software, microcode, etc.

Additionally and/or alternatively, aspects of the invention can be embodied in the form of a computer program product that is accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by, or in connection with, the instruction execution system, apparatus, or device.

A computer-readable medium can be an electronic, magnetic, optical, electromagnetic, infrared, or semiconductor system (or apparatus or device) or a propagation medium. Examples of a computer-readable medium include a semiconductor and/or solid-state memory, magnetic tape, a removable computer diskette, a random access memory (RAM), a read-only memory (ROM), a rigid magnetic disk and an optical disk. Current examples of optical disks include, without limitation, compact disk—read only memory (CD-ROM), compact disk—read/write (CD-RW) and DVD.

In accordance with aspects of the invention, a data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (i.e. I/O devices)—including but not limited to keyboards, displays, pointing devices, etc.—can be coupled to the system either directly or through intervening I/O controllers.

Network adapters may also be coupled to the system to enable communication between multiple data processing systems, remote printers, or storage devices through intervening private or public networks. Modems, cable modems and Ethernet cards are just a few of the currently available types of network adapters.

Figure 2:
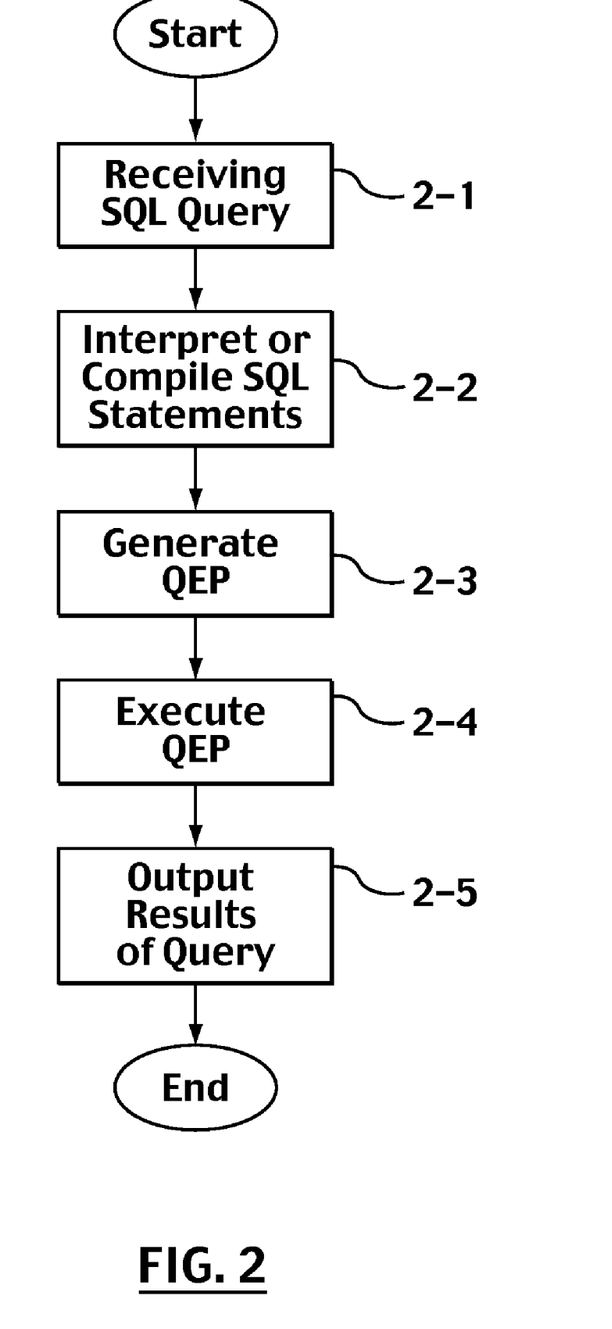
FIG. 2 is flow chart illustrating a method of accessing information in a database in accordance with aspects of the invention.

FIG. 2 is flow chart illustrating a method of accessing information in a database in accordance with aspects of the invention. Starting at step 2-1, the method includes receiving an SQL query. For example, the client computer 102 receives a query in SQL form from a user or another computer. Step 2-2 of the method includes interpreting and/or compiling the received SQL statements used to define the query. Step 2-3 of the method includes generating a compiled set of runtime structures (i.e. a QEP) from the compiled SQL statements. In accordance with some aspects of the invention, a query optimizer may transform and/or optimize the SQL query in a manner described in more detail further below. Generally, the SQL statements received as input specify the desired data, but not how to retrieve the data. The query optimizer considers both the available access paths (indexes, sequential reads, etc.) and system held statistics on the data to be accessed (e.g. size of the table, the number of distinct values in a particular column, etc.), to choose what it determines to be the most efficient access path for the query. Subsequently, given a selected QEP, step 2-4 of the method includes executing the QEP and step 2-5 includes outputting the results of the QEP.

Figure 3:
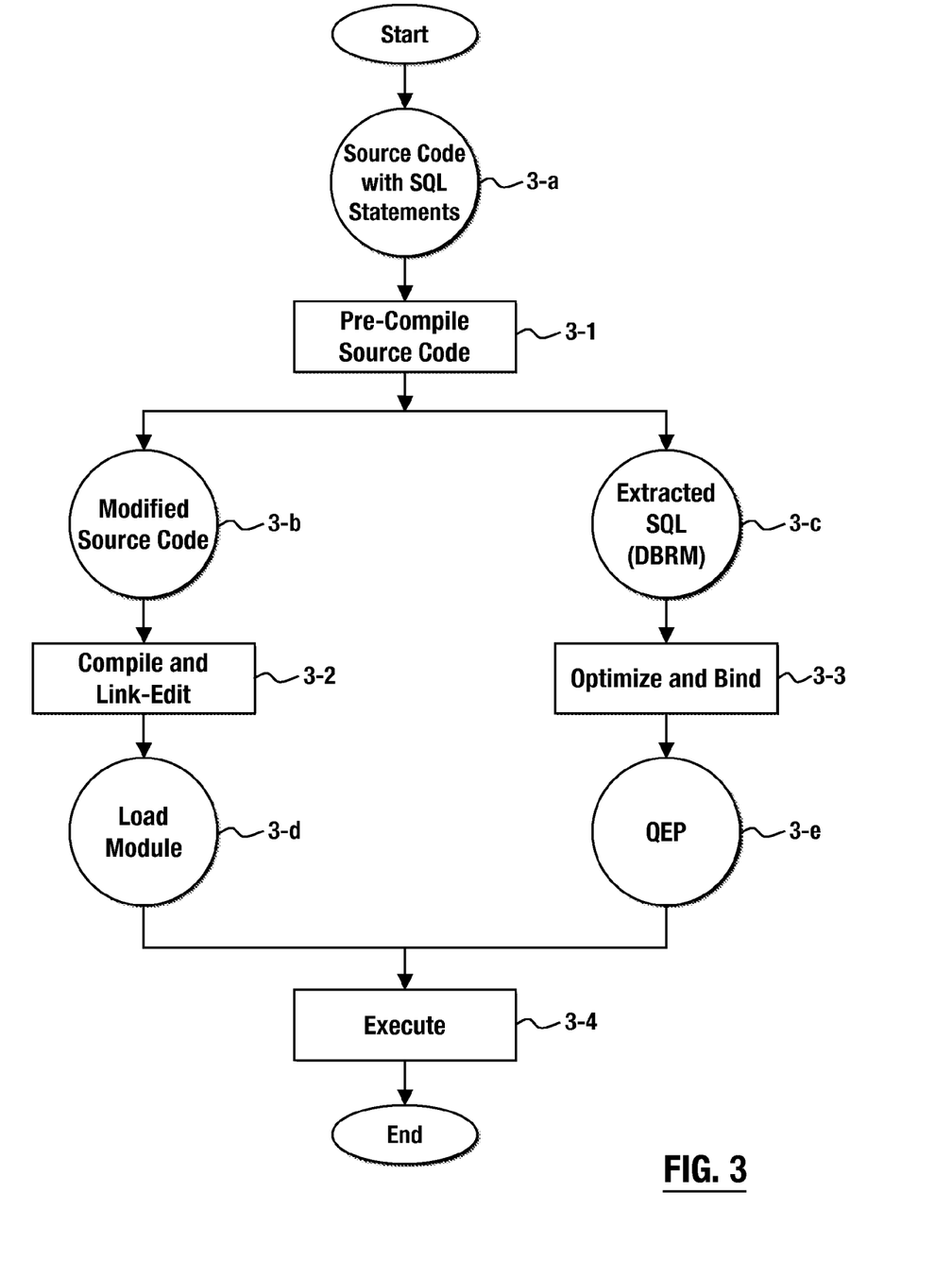
FIG. 3 is a flow chart illustrating a method of interpreting and executing SQL statements embedded in source code in accordance with aspects of the invention.

FIG. 3 is a flow chart illustrating a method of interpreting and executing SQL statements embedded in source code in accordance with aspects of the invention. Starting with program source code 3-a containing a host language (e.g. Cobol or C++) and embedded SQL statements, step 3-1 of the method includes pre-compiling the program source code to produce a modified source code module 3-b and a Database Request Module (DBRM) 3-c. The modified source code module 3-b contains host language calls to the RDBMS, which are inserted in place of SQL statements during pre-compiling. The DBRM 3-c includes the SQL statements extracted from the program source code 3-a.

Step 3-2 of the method includes compiling and link-editing the modified source code 3-b to produce a load module 3-d. Step 3-3 of the method includes optimizing and binding the DBRM to produce a compiled set of runtime structures for the QEP 3-e. As described above with reference to FIG. 2, the SQL statements in the program source code 3-a specify the desired data, but not how to retrieve the data. The query optimizer considers both the available access paths (indexes, sequential reads, etc.) and system held statistics on the data to be accessed (e.g. size of the table, the number of distinct values in a particular column, etc.), to choose what it determines to be the most efficient access path for the query. Subsequently, given a selected QEP, step 3-4 of the method includes executing the load module 3-d and QEP 3-e.

With reference to steps 2-3 and 3-3, described above for the sake of illustrative example only, one of the most important factors in determining the execution characteristics of a QEP operation, and hence a QEP, is the number of records on which it operates, which is otherwise known as cardinality. Some QEP operations apply predicates that specify information sought in respective columns, thus reducing the number of records seen by subsequent operations.

Incremental Application of a Search Condition

How and when predicates can be applied is a function of how a table is defined. For example, a table can be defined as having a number of columns and a respective searchable index defined for one or more of the columns. Such an index relates values in a particular table column to specific respective row Identification Numbers (i.e. row ID's). As will be described in greater detail below, a table can also be range-partitioned. The data in a range-partitioned table is organized such that the table data is divided across multiple data partitions according to values in one or more columns of the table. The columns on which the partitions are defined are known as key columns. An index for a range-partitioned table may also relate values in a particular column to partition ID's, in addition to relating values in the column to row ID's.

As an introductory example, consider the following query, which shows a query to a Table 1 specifying orders for one customer in a given quarter. Table 1 has columns O_ORDERDATE and O_CUSTKEY and is indexed only on the O_ORDERDATE column.

```
SELECT*
FROM TABLE 1
WHERE O_ORDERDATE BETWEEN '10/01/97' AND '12/31/97'
    AND O_CUSTKEY = 'ABC'
ORDER BY O_ORDERDATE;
```

The above query represents a respective index access to Table 1. In an example QEP an index on the O_ORDERDATE column is used to directly access the records qualified by the predicate O_ORDERDATE between 'Oct. 1, 1997' and 'Dec. 31, 1997', by what is known as an index scan operation (IXSCAN operation). The IXSCAN operation accesses the index to retrieve row ID's for the values in O_ORDERDATE specified by the predicate. The qualifying records (i.e. those that are between 'Oct. 1, 1997' and 'Dec. 31, 1997'), are then retrieved from the ORDERS relation by a FETCH operation which filters records further by applying the predicate O_CUSTKEY='ABC'.

By first applying the predicate for O_ORDERDATE and then for O_CUSTKEY, the above described QEP illustrates a technique of incremental application of a search condition. That is, the search condition is transformed into a conjunctive normal form and each conjunct, or predicate, is applied independently (e.g. first O_ORDERDATE and then O_CUSTKEY). Since a predicate can be used to reject a row from further processing, it is usually applied as soon as it becomes eligible for application. A predicate becomes eligible as soon as all columns it references are available. For example, the predicate defined on O_CUSTKEY could not have been applied first because Table 1 is not indexed on the O_CUSTKEY column.

The search condition in the above example query has two predicates P1 and P2. The first predicate, P1, is O_ORDERDATE between 'Oct. 1, 1997' and 'Dec. 31, 1997', and the second predicate, P2, is O_CUSTKEY='ABC'. The predicate O_ORDERDATE between 'Oct. 1, 1997' and 'Dec. 31, 1997' is eligible for the IXSCAN operation since the O_ORDERDATE column is stored in the index. However, as already noted, the predicate O_CUSTKEY='ABC' is not eligible until the O_CUSTKEY column has been retrieved from the table by the FETCH operation, since Table 1 is not indexed on O_CUSTKEY.

Incremental Cardinality Estimation with Statistically Independent Predicates

Each predicate in a query's WHERE clause is assigned a respective "filter factor" or "selectivity", which represents the probability that any row from the base table(s) will satisfy that predicate. The filter factors are typically derived from statistics about the database, such as the number of distinct values of the referenced column, which is also known as the column cardinality cc(A), where A is the reference column. In turn, the selectivity of A is sel(A)=1/cc (A). In accordance with other aspects of the invention, more detailed statistics such as histograms or frequency values may also be employed.

In order to simplify cardinality estimation, most query optimizers make the assumption that this filtering effect, or selectivity, of one predicate is (probabilistically) independent of the selectivity of another. In the example above, this implies that a given company does not influence when orders are placed, and vice versa. Whether this assumption is valid or not is a characteristic of the semantics of the underlying columns, not the predicates. Under this assumption, the resulting cardinality is computed for any portion of a QEP by progressively multiplying the cardinality of the base table by the selectivity of each predicate as it is applied. That is, cardinality estimation under this independence assumption proceeds incrementally, as each predicate is applied.

Incremental cardinality estimation under the independence assumption will be illustrated by considering an expansion of the above example related to Table 1. Assume that 100,000 orders have been collected for 20 quarters and that there are 100 known customers. Under a typical optimization assumption that column data is distributed uniformly (i.e., that orders are placed uniformly over time and each customer is equally likely to place an order), the optimizer would assign a selectivity of 1/20 to the predicate O_ORDERDATE between 'Oct. 1, 1997' and 'Dec. 31, 1997' and 1/100 to the predicate O_CUSTKEY='ABC'. The optimizer would then estimate that the IXSCAN operation would produce 5,000 rows by multiplying the selectivity of the predicate O_ORDERDATE between 'Oct. 1, 1997' and 'Dec. 31, 1997' by the cardinality of the orders table (i.e., 1/20*100,000). The optimizer would then estimate that the FETCH operation would further reduce these 5,000 rows to 50 rows by applying the selectivity of the predicate O_CUSTKEY='ABC' to the number of rows produced by its input operation, IXSCAN (i.e., 1/100*5,000).

The technique of incremental cardinality estimation is efficient, but often inaccurate when the information in two or more columns is correlated. Predicate selectivities can be computed once rather than each time the predicate is considered in an alternative QEP. Cardinality estimation involves simply reducing the previous estimate by the selectivity of a predicate as it is applied. Each operator need only track the cardinality estimate in progress. This cardinality estimation technique is easily extended for operations with multiple inputs. For example, the cardinality estimate for the UNION operation is simply the sum of the incremental cardinality estimates for all of its inputs.

Statistically Correlated Predicates

Unfortunately, in practice, the selectivity of predicates may not be independent. The selectivities of one or more predicates are statistically correlated (i.e., they are not independent) if their combined selectivity is different from their selectivities when considered in isolation. Predicates on different columns can have varying degrees of correlation, and can have correlation with more than one other predicate.

For example, consider a Table 2 of different types of cars, each having a MAKE (i.e., manufacturer), MODEL, STYLE (e.g., sedan, SUV, station wagon, etc.), YEAR, and COLOR. Predicates on COLOR are likely to be independent of those on MAKE, MODEL, STYLE, or YEAR, as most every manufacturer makes the same standard colors available for each of their models and styles, year after year. However, the predicates MAKE='Honda' and MODEL='Accord' certainly are not independent, since only Honda makes a model called 'Accord'. The correlation may be subtler than this rather obvious hierarchy of attributes. For example, a predicate STYLE='hatchback' is correlated to any predicates on YEAR; MAKE; and MODEL, since not every manufacturer or every MODEL had a hatchback STYLE. Freytag et al. discloses a method for computing adjustment factors for statistically correlated fully applicable predicates, but again, does not include a method for handling partially applicable predicates applied against range-partitioned tables.

Range-Partitioned Tables, Data Partition Elimination & Cardinality Estimation

The problems associated with statistical correlation as they relate to cardinality estimation are exacerbated in range-partitioned tables. One of the reasons is that a predicate for a key column can be partially applied to eliminate partitions containing multiple rows; thereby leading to a partial predicate that has an effect on cardinality estimation.

As noted above, a range-partitioned table includes partitions that are defined over ranges of values within tables. For range-partitioned tables, predicates on the partitioning columns can potentially exclude certain data partitions from query processing, thus saving resources and time.

For example, Table 2 introduced above can be ranged-partitioned as follows:

TABLE 2

| Partition No. | MAKE | MODEL | STYLE | YEAR |
|---|---|---|---|---|
| 1 | Honda = 1 | 1-10 | ... | ... |
|   | Acura = 2 | 1-9 | ... | ... |
| 2 | Toyota = 3 | 1-12 | ... | ... |
|   | Lexus = 4 | 1-8 | ... | ... |
| 3 | Ford = 5 | 1-15 | ... | ... |
|   | Land Rover = 6 | 1-5 | ... | ... |
|   | Volvo = 7 | 1-8 | ... | ... |
|   | Jaguar = 8 | 1-7 | ... | ... |
| 4 | General Motors = 9 | 1-14 | ... | ... |
|   | Saturn = 10 | 1-10 | ... | ... |

In Table 2 shown above there are four partitions defined on the MAKE column, thereby making the MAKE column the leading-column or key column. Each partition is defined in a corresponding partition definition key. The first partition includes cars from automobile manufacturers Honda™ and Acura™, the second partition includes cars for Toyota™ and Lexus™, the third partition includes cars from Ford™, Land Rover™, Volvo™ and Jaguar™ and the fourth partition includes cars for General Motors™ and Saturn™. The MODEL, STYLE and YEAR columns are non-partitioning columns and list information relating to a respective MAKE. For example, Honda is listed as having MODEL's 1-10, which would each have respective STYLE and YEAR information in the Table 2. Given that this is simply an example, the specific MODEL, STYLE and YEAR information has not been provided.

A query with a predicate MAKE=Honda will only need to scan the first partition, since the other partitions do not contain any data that will satisfy the predicate. The process of excluding data partitions from consideration in query processing based on query predicates is referred to as data partition elimination. Moreover, while a table can be partitioned on one column it is possible that it may be indexed on another column.

Data partition elimination may result in fewer number of rows being accessed (since only a subset of all data partitions will be accessed), thus filtering the stream cardinality before the predicates used in data partition elimination are fully applied. Accordingly, a predicate is partial (or partially applied) if the predicate filters the stream before full application. Therefore, predicates used in data partition elimination are partially applied before they become fully applied, meaning that a partial predicate is applied to exclude partitions without specifically re-qualifying values in particular rows.

In accordance with aspects of the invention, in order to estimate the cardinality the partition selectivity (the partial selectivity of the predicates) is considered. For example, if we have predicates P1, P2 and P3, where P1 and P2 are predicates applied at an index scan (i.e. IXSCAN), and P3 may be used for data partition elimination, then the output cardinality estimate of this index scan needs to take into consideration the "partition selectivity of P3", psel(P3), even though P3 is not applied at the index scan. Hereinafter, the partition selectivity is also referred to as partial selectivity.

Generally, assuming uniformity, the partition selectivity (e.g. psel(P3)) is defined as the ratio of qualified partitions over the number of total partitions for a predicate (e.g. P3). For example, the partition selectivity of MAKE=Honda (i.e. psel(MAKE=Honda), in the example above, is 0.25, given that only one partition contains data for Honda and there are four partitions in total. Additionally, when partially applicable predicates are correlated (possibly also to fully applicable predicates), a combined selectivity estimate is dependent on the order that the partially applicable predicates are applied. The predicates on non-leading columns of the data partitioning key eliminate partitions only if predicates exist on the leading columns that eliminate partitions. As a result, a selectivity estimate of a predicate (full or partial) on a non-leading column is dependent on the elimination effect of the predicates on the leading columns. Subsequently, in accordance with aspects of the present invention, for data partition elimination, the selectivity estimate of the partially applied predicate is computed conditionally. That is, the selectivity estimate is computed for the predicates (full and partial) in the order that the predicates are applied, and the selectivity estimate is also based on the selectivity of the previous set of predicates. Examples are provided below with reference to a Table 3 to provide clarification.

In accordance with aspects of the present invention, there is provided a method for estimating the cardinality of a query containing a partially applicable predicate that is correlated with another partially applicable predicate and/or a fully applicable predicate. In accordance with more specific embodiments of the invention, the method includes first estimating the cardinality assuming independence between predicates and then estimating an adjustment factor to account for the correlation between at least one partially applied predicate and another predicate that is either fully applicable or partially applicable.

Provided as an illustrative example only, provided below is a range-partitioned Table 3. Table 3 has the following four partitions defined on columns A and B together; the first partition starts at (A,B)=(1,1) and ends at (A,B)=(2,20); the second partition starts at (A,B)=(3,1) and ends at (A,B)=(4,20); the third partition starts at (A,B)=(5,21) and ends at (A,B)=(6,40); and, the fourth starts at (A,B)=(7,21) and ends at (A,B)=(8,40).

TABLE 3

| Partition No. | A | B |
|---|---|---|
| 1 | 1 | 1-10 |
|   | 2 | 11-20 |
| 2 | 3 | 1-10 |
|   | 4 | 11-20 |
| 3 | 5 | 21-30 |
|   | 6 | 31-40 |
| 4 | 7 | 21-30 |
|   | 8 | 31-40 |

There are a number of statistics that can be collected for a table such as Table 3. One specific group of such statistics is sometimes referred to as Column Group Statistics (CGS). A first statistic is column cardinality, cc( ), which is defined as the number of distinct values in a particular column. For example, the column cardinality of column A is cc(A)=8 and the column cardinality of column B is cc(B)=40. A second statistic is the number of distinct combinations of values in two or more columns that exist in a table. With reference to Table 3, cc(A,B)=80 (i.e. (A,B)=(1,1) to (A,B)=(8,40)). In this particular case cc(A,B) is also the row-count value for Table 3.

Figure 4:
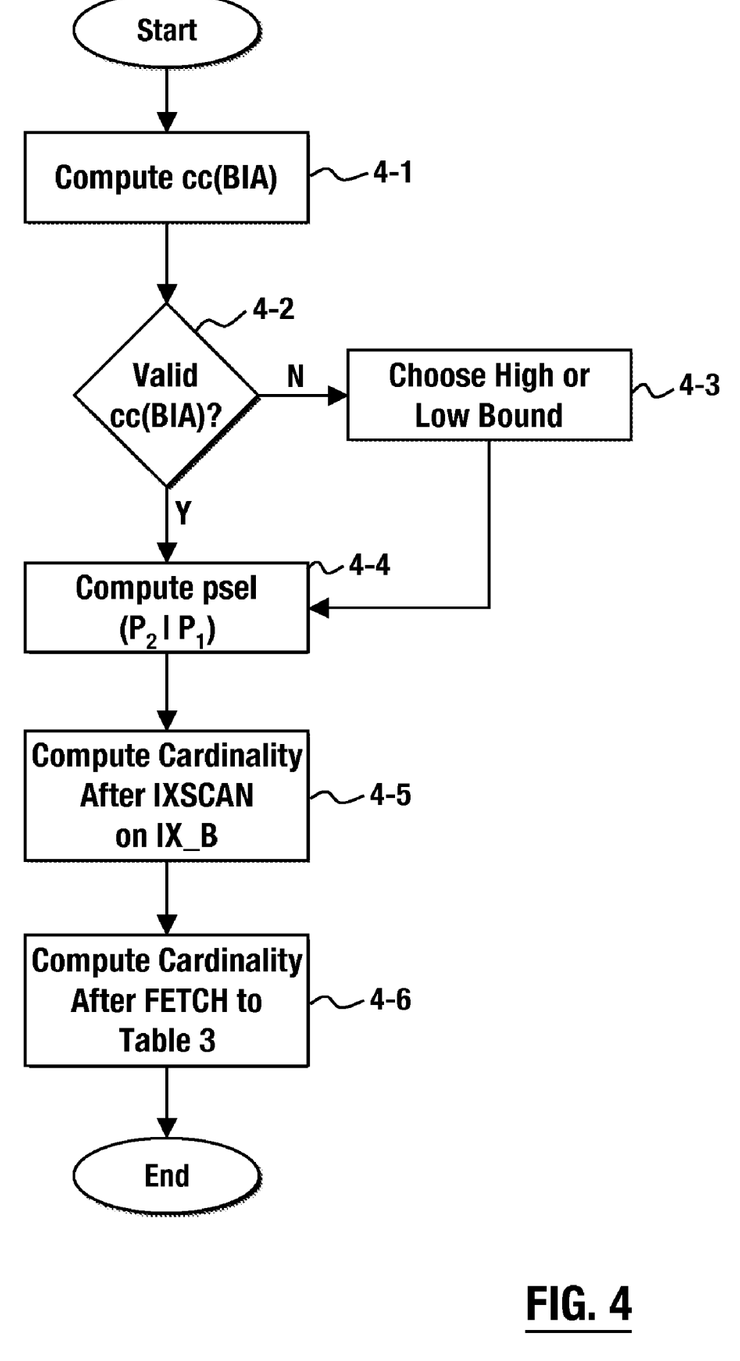
FIG. 4 is a flow chart illustrating the steps in a first example Query Execution Plan (QEP) and a corresponding first example method of cardinality estimation using partially applied predicates in accordance with aspects of the present invention.
Figure 5:
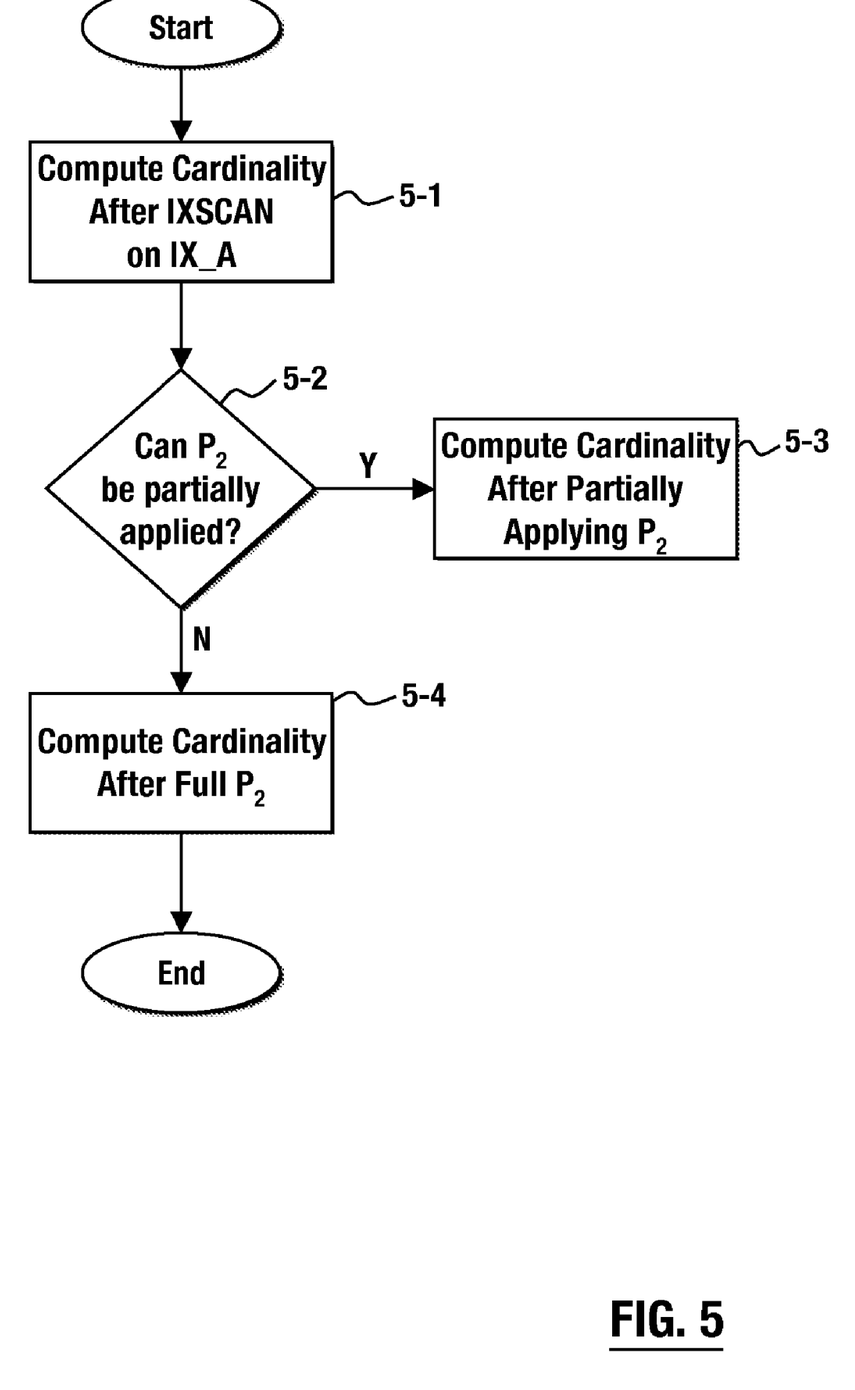
FIG. 5 is a flow chart illustrating the steps in a second example QEP and a corresponding second example method of cardinality estimation using partially applied predicates in accordance with aspects of the present invention.
Figure 6:
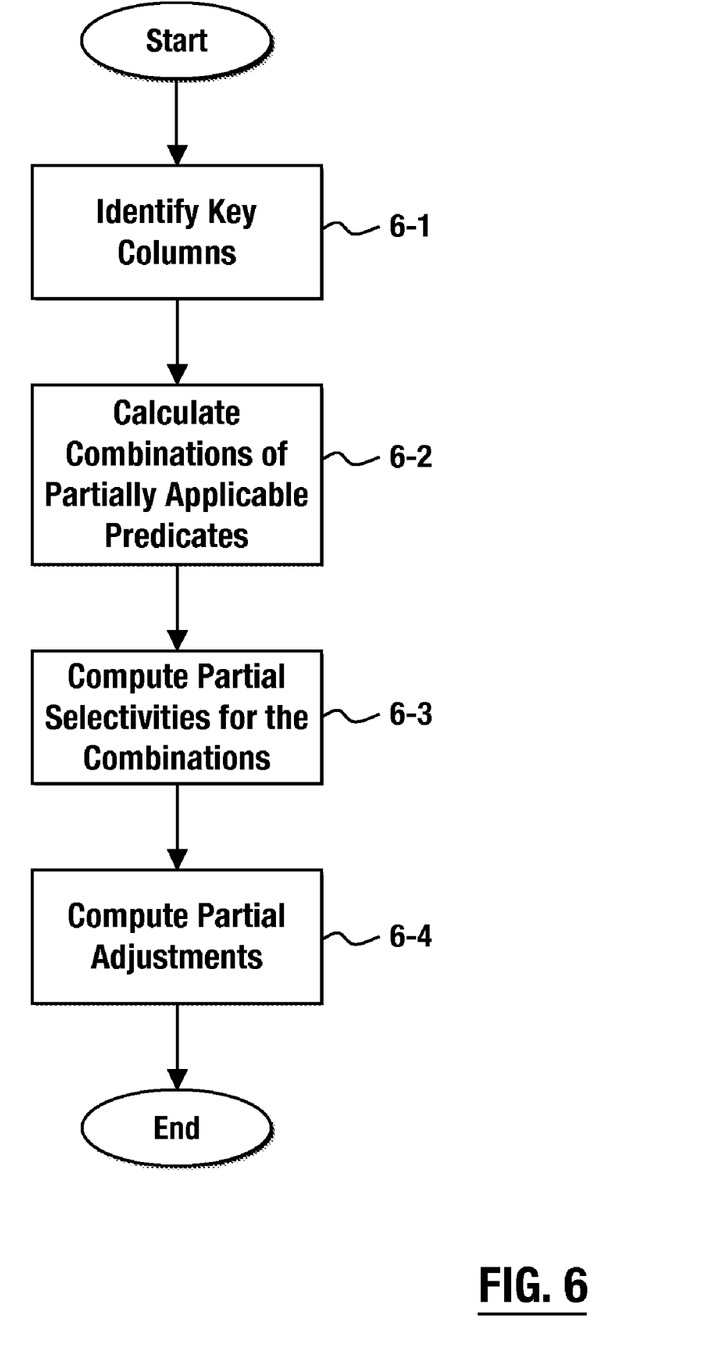
FIG. 6 is a flow chart illustrating the steps in a third example QEP and a corresponding third example method of cardinality estimation using partially applied predicates in accordance with aspects of the present invention.

With reference to FIGS. 4, 5 and 6 shown are examples of how statistically correlated predicates may be applied and how corresponding cardinality estimates are determined in accordance with aspects of the invention. To that end, consider the following two predicates P1 and P2 defined as:

$P1: A=1$ $P2: B=1$

Assuming uniformity, it is then possible to define the fully applied selectivities of P1 and P2 as:

$sel(P1) = 1/cc(A) = 1/8$ $sel(P2) = 1/cc(B) = 1/40$ $sel(P1, P2) = 1/cc(A,B) = 1/80$ given that there are 8 distinct values of A, 40 distinct values of B and 80 distinct combinations of A and B, as noted above.

Again assuming uniformity, it is also possible to define the partial applied selectivities of P1 and P2 as:

$psel(p1) = 1/4$ $psel(p1, p2) = 1/4$ $psel(p2) = psel(p1,p2)/psel(p1) = 1$ which means that after partially applying P1, partially applying P2 does not eliminate any more partitions.

In a first example, with reference to the flow chart illustrated in FIG. 4, the Table 3 is indexed on the non-leading column "B" to provide IX_B, which is provided below. The index IX_B provides row ID's and partition ID's for respective values in column "B".

| IX_B | | | | | | | | |
|---|---|---|---|---|---|---|---|---|
| Value of B | 1-10 | | 11-20 | | 21-30 | | 31-40 | |
| Row ID | 1-10 | 21-30 | 11-20 | 31-40 | 41-50 | 61-70 | 51-60 | 71-80 |
| Partition ID | 1 | 2 | 1 | 2 | 3 | 4 | 3 | 4 |

With specific reference to Table 3 and IX_B, the index IX_B provides a listing of values of B (i.e. 1-40) as they relate to respective row ID's and partition ID's. For example, values of B equal to 1-10 are found in rows 1-10 and 21-30 that are respectively located in corresponding partitions 1 and 2. In use, the index on B, IX_B can be scanned (e.g. using an IXSCAN operation) for particular values of B to retrieve the partition and row information corresponding to those values of B without having to search the whole of Table 3 to locate the same information.

Before turning to FIG. 4, consider an index scan (i.e. IXSCAN) over the index on B, IX_B using predicates P1 and P2. Given that predicate P2 is defined for values of B and IX_B is also defined for B, it is likely efficient to apply P2 before P1. If it is assumed that the fully applied P2 and partially applied P1 are independent, then the output cardinality after the IXSCAN can be calculated as:

$$IXSCAN\_card = row\text{-}count * sel(P2) * psel(P1) = 0.5$$

After the IXSCAN, P1 can be fully applied on the rows fetched from Table 3. Accordingly, the cardinality estimate could be calculated as:

$$FETCH\_card = IXSCAN\_card * sel(p1, p2) *$$
$$1/psel(p1) * 1/sel(p2)$$
$$= 1$$

thereby accounting for the combined selectivity of P1 and P2 by dividing out the sel(p2) and psel(p1).

However, there is a problem with the scenario just described. The IXSCN_card (=0.5) is less than the FETCH_card (=1) which is not possible because the FETCH operation cannot add rows to the output stream, and may only filter rows out of the output stream. Thus, by not accounting for the statistical correlation between the partially applicable predicate P1 and the fully applicable predicate P2 at the index scan, an optimizer, if operating as just described, would underestimate the cardinality for the index scan (i.e. IXSCAN_card). The cardinality estimate is corrected once P1 is fully applied, but this does not occur until the FETCH is considered, which means that the optimizer would under-cost the index scan.

Turning to FIG. 4, shown is a flow chart illustrating the steps in a first Query Execution Plan (QEP) and a corresponding first method of cardinality estimation using partially applied predicates in accordance with aspects of the present invention. Starting at step 4-1, the method includes computing an expected value, cc(B|A), of the number of rows per partition after a first predicate has been partially applied. The expected value cc(B|A) can be calculated as follows:

$$cc(B|A) = cc(B) * (1 - (1 - 1/p)^{(cc(A,B)/cc(B))})$$

where p is the number of partitions with distinct values of A, cc(B|A) represents the number of distinct values of B per set of distinct partitions defined by A (i.e. expected value of the number of rows per partition after a first predicate has been partially applied) and B is a non leading column in the partitioning key. In this particular example, cc(B|A)=17.5.

Step 4-2 includes computing boundary values of cc(B|A), $cc(B|A)_{min}$ and $cc(B|A)_{max}$, which are calculated as follows:

$$cc(B|A)_{min} = cc(A,B)/cc(A) = 80/8 = 10$$

$$cc(B|A)_{max} = MIN[cc(B), cc(A,B)/p] = 20$$

Step 4-2 also includes determining whether or not cc(B|A) is within the boundary values. If cc(B|A) is not within the boundary values (no path, step 4-2), then the method proceeds to step 4-3 that includes choosing the boundary value $cc(B|A)_{min}$ or $cc(B|A)_{max}$ that is closest to the calculated value of cc(B|A) before proceeding to step 4-4. On the other hand, when calculated value of cc(B|A) is within boundary values (yes path, step 4-2), the method proceeds directly to step 4-4 employing the calculated value of cc(B|A).

Step 4-4 includes calculating the psel(P2|P1), which is calculated as:

$$psel(P2|P1) = 1/cc(B|A) = 2/35$$

Following step 4-4, at step 4-5 the method includes computing the IXSCAN_card as follows:

$$IXSCAN\_card = row\text{-}count * psel(P2|P1) * psel(P1) = 8/7$$

Finally, step 4-6 of the method includes computing FETCH_card as follows:

$$FETCH\_card = IXSCAN\_card * sel(P1,P2) * 1/psel(P1)$$
$$* 1/psel(P2|P1) = 1$$

In this first example, the effect of fully applying P2 is removed by dividing by sel(P2) during the calculation of the IXSCAN_card.

In a second example, with reference to the flow chart illustrated in FIG. 5, Table 3 is indexed on the leading column "A" to provide IX_A, which is provided below. The index provides row ID's and partition ID's for respective values in column "A".

| IX_A | | | | | | | | |
|---|---|---|---|---|---|---|---|---|
| Value of A | 1 | 2 | 3 | 4 | 5 | 6 | 7 | 8 |
| Row ID | 1-10 | 11-20 | 21-30 | 31-40 | 41-50 | 51-60 | 61-70 | 71-80 |
| Partition ID | 1 | | 2 | | 3 | | 4 | |

With specific reference to Table 3 and IX_A, the index IX_A provides a listing of values of A (i.e. 1-8) as they relate to respective row ID's and partition ID's. For example, the value A=3 is found in rows 21-30 that are respectively located in corresponding partition 2. In use, the index on A, IX_A can be scanned (e.g. using an IXSCAN operation) for particular values of A to retrieve the partition and row information corresponding to those values of A without having to search the whole of Table 3 to locate the same information.

Given that P1 and IX_A are both defined on A, it is likely more efficient to fully apply P1 first in an index scan operation (IXSCAN). As noted above, the sel(P1) fully applied is 1/8 during the index scan. Subsequently, partially applying P2 does not add any more selectivity because psel(P2) is 1. That is, in this case, it is not necessary to account for the fully applied predicate P1 and the partially applied predicate P2, since P1 is applied on the leading column of the partitioning key which means that multiple values in B may correspond to a single value in A, but not vice versa.

In accordance with aspects of the invention, the correlation between P1 and P2 is accounted for by calculating the partial selectivity of P2 conditionally on P1 (that is, psel(P2)=psel(P1,P2)/psel(P1)). At the index scan when P1 is fully applied partitions 2-4 are eliminated from further consideration and partially applying P2 cannot possibly eliminate any more partitions given that the psel(P2) is conditionally calculated as a function of psel(P1). In turn, all of the rows in the first partition must be fetched and P2 fully applied to satisfy the rest of the query defined by predicates P1 and P2.

Turning to FIG. 5, shown is a flow chart illustrating the steps in a second QEP and a corresponding second method of cardinality estimation using partially applied predicates in accordance with aspects of the present invention, as just described above. Starting at step 5-1, the method includes calculating the cardinality after the index scan as follows:

IXSCAN=row-count*sel(P1)=10

At step 5-2, the method includes determining whether or not the predicate P2 can be partially applied. As described above, in the present example, since the psel(P2)=1 and since psel(P2) is calculated conditionally on psel(P1), there is no point in partially applying P2. Accordingly, the method proceeds to step 5-4. On the other hand, if is psel(P2)<1, the method would proceed to step 5-3 where the cardinality is calculated after partially applying P2. At step 5-4, the method includes computing the cardinality after fully applying P2.

In a third example, if the Table 3 is indexed on a column other than the partitioning key columns A and B, predicates P1 and P2 cannot be partially applied at the index scan and may only be fully applied at the FETCH. Any correlation between predicates P1 and P2 can be accounted for as described in Freytag et al.

Referring to FIG. 6, shown is a flow chart illustrating the steps in a third QEP and a corresponding third method of cardinality estimation using partially applied predicates in accordance with aspects of the present invention. This third method is a generalization of the inventive concepts discussed thus far and is presented in combination with source code showing how the methods steps may be embodied according to very specific aspects of the invention.

In this third example, consider an arbitrary range-partitioned table T with a number of columns and rows, and a query defined with P predicates. Pp represents the set of predicates on the key columns in the set of predicates P (i.e., those columns used to define the partitions in the table T). Further, Pp_COMB represents the set of all combination of the key column predicates Pp. If there are j such key column predicates, then there will be $(2^j-1)$ combinations in Pp_COMB.

With specific reference to FIG. 6, starting at step 6-1, the method includes identifying the set of key column predicates Pp. Step 6-2 of the method includes calculating all the combinations of the key column predicates, which can be accomplished using the following source code properly compiled:

```
//------------------------------------------------------------
//SUBROUTINE: COMPUTE_ALL_PRED_COMBINATIONS
//------------------------------------------------------------
//INPUTS: P - set of predicates {p1, p2, ..., pn} for n >= 0
//OUTPUT: L - list of predicate sets, initially empty
COMPUTE_ALL_PRED_COMBINATIONS:
BEGIN
    IF P == { }THEN
        RETURN L
    ENDIF
    L = COMPUTE_ALL_PRED_COMBINATIONS({P - p1}, L);
    FOR EACH element E in L DO:
        create set P' = {E + p1}
        add P' to L
    END FOR
    create set P' = {p1}
    add P' to L
    RETURN L
END
```

After the combination of key column predicates are determined, the method proceeds to step 6-3, which includes calculating the partition selectivities (i.e. psel( ) values) for each combination of key column predicates. In accordance with aspects of the present invention, the partial selectivity of the various combinations is calculated conditionally as described above with reference to FIG. 4. Generally, the partition selectivity, psel(p1, . . . , pt), after applying a number of predicates p1, . . . , pt, is equal to the number of qualified partitions divided by the total number of partitions, assuming uniformity. For the sake of simplified notation, the predicate p1 is the most leading key column predicate and as described above the psel(p1) is the number of qualified partitions after applying the predicate p1 divided by the total number of partitions. In general, the conditional partition selectivity of the predicate pt is as follows:

$$psel(pt) = psel(p1, \ldots, pt)/(psel(p1) * \ldots * psel(pt-1))$$
$$= psel(p1, \ldots, pt)/psel(p1, \ldots, pt-1)$$

Step 6-4 of the method includes calculating partial adjustments. As described above with reference to the second example and FIG. 5, the partial adjustments do not need to be calculated explicitly when none of the predicates can be fully applied on an index scan. However, calculating the partial adjustments can be accomplished using the following source code properly compiled:

```
//------------------------------------------------------------
//SUBROUTINE: COMPUTE_PARTIAL_ADJUSTMENTS
//------------------------------------------------------------
//INPUTS: Pp -set of predicates that are partially applied
//    P - set of all predicates applicable on T, including Pp
//    Psel - partial selectivity of Pp
//    T - table under consideration
//
COMPUTE_PARTIAL_ADJUSTMENTS:
BEGIN
    LET Cp = set of columns in T referenced by Pp
    Compute cc(Cp); //either a CGS on Cp exists or some method to
                    estimate it
                    //if don't want to estimate it, then bail out and assume
                    //independence
    FOR EACH CGS in T DO:
        Let Pc = the set of predicates in P that reference the columns in CGS
        //if the partially applied predicates are referenced
        //by this CGS, then we can create a partial adjustment
        IF Pp <= Pc THEN // Subset test
            Let Pf = Pc-Pp
            Let Cf = set of columns referenced by Pf
            //Cp is more significant than Cf if >=1 columns
            //in Cp are leading columns ahead of those in Cf
            //For example, if the partitioning key is on (A,B)
            //and Cp contains A and Cf contains B, then Cp
            //is more significant than Cf.
            //If Cp is not more significant than Cf, then
            //there is nothing to be done.
            IF Cp is more significant than Cf THEN
                Psrc = preds on leading columns of the partkey not
                    in Pp (the source predicates of Pp)
                //Compute cc(Cf/Cp)
                //If a CGS on Cp does not exist, then it can be estimated,
                //or we can bail out and assume independence
                cc(Cf|Cp) =
                COMPUTE_PER_PARTITION_COLCOUNT(Cf, Cp)
                //Compute the selectivity of the fully applied preds
                //dependent on the preds in Pp being partially applied
                sel(Pf|Pp) = 1/cc(Cf|Cp)
                //CREATE ADJUSTMENT (and cache it some
                where for later use)
                //This adjustment will remove the sel of Pf
                (which is independent
```

-continued

```
        //of the partial selectivity of Pp) and apply the sel of Pf
        //dependent on Pp being partially applied.
            ADJUSTMENT
                .factor = sel(Pf|Pp) / sel(Pf)
                .full_preds = Pf
                .partial_preds = Pp
                .source_preds =P_src
        ENDIF
      ENDIF
    ENDFOR
END
//-----------------------------------------------------------------
//SUBROUTINE: COMPUTE_PER_PARTITION_COLCOUNT
//-----------------------------------------------------------------
//INPUTS: Cols set of non-leading partitioning key columns
//   dpCols set of leading partitioning key columns
//
//OUTPUT: Returns the # of distinct groupings of Cols, per-partition
//   defined by dpCols. For example, if T is partitioned on A,B
//   and Cols = {B,C} and dpCols = {A}, then this function
//   returns cc(B,C|A), the number of distinct (B,C) groups in
//   each distinct partition defined by A.
COMPUTE_PER_PARTITION_COLCOUNT (Cols, dpCols)
BEGIN
    N = cc(dpCols) //either single column colcard stat, or multi-column
    CGS
    D = cc(Cols) //either single column colcard stat, or multi-column CGS
    //Compute the number of distinct partitions defined by dpCols.
    P = NUM_PARTS(dpCols)
    //minimum number of distinct groupings of Cols per-partition
    //is cc(Cols+dpCols)/cc(dpCols)
    MIN_CC = cc(Cols+dpCols) / cc(dpCols)
    //maximum number of distinct groupings of Cols per-partition
    //is min(cc(Cols), cc(dpCols,Cols)/P)
    MAX_CC = MIN(cc(Cols), cc(dpCols,Cols)/P)
    //The estimator below assumes the data is uniformly distributed
    //across all partitions, and that there is data in each partition.
    //In the real world, some partitions could be empty, and therefore
    //we could end up with MAX_CC < MIN_CC. In this case, we simply
    bound
    //the result by MIN_CC.
    //Also, if MIN_CC = = MAX_CC, then simply bound by
    MIN_CC as well
    //since the estimator won't give us a better result
    IF MAX_CC <= MIN_CC THEN
        RETURN MIN_CC
    ELSE
        //estimate the per-partition column statistic
        EST_CC = D * (1 -((1 - 1/p)**(N/D) ))
        //bound the result by MAX_CC and MIN_CC
        //if required
        IF EST_CC > MAX_CC THEN
            RETURN MAX_CC
        ELSIF EST_CC < MIN_CC THEN
            RETURN MIN_CC
        ELSE
            RETURN EST_CC
        ENDIF
    ENDIF
END
```

While the above description provides example embodiments, it will be appreciated that the present invention is susceptible to modification and change without departing from the fair meaning and scope of the accompanying claims. Accordingly, what has been described is merely illustrative of the application of aspects of embodiments of the invention and numerous modifications and variations of the present invention are possible in light of the above teachings.

We claim:

1. A method for estimating the cardinality resulting from the application of one or more partially applied predicates against a range-partitioned table of a database, the method comprising:

identifying at least one key column, wherein the at least one key column at least partially defines one or more data partitions in the range-partitioned table;

calculating at least one combination of partially applicable predicates;

calculating the partial selectivities for the at least one combination of partially applicable predicates, determining a Query Execution Plan (QEP) based on the estimated cardinality;

determining whether or not a particular predicate can be partially applied to achieve a useful result;

computing a corresponding partial selectivity value for the particular predicate, if the particular predicate can be partially applied; and accessing the range-partitioned table in the database based on a plan specified by the OEP, wherein the partial selectivities, psel(pl, . . . , pt), after applying a number of predicates pl, . . . , pt, are equal to a number of qualified partitions divided by the total number of partitions; and wherein the partially applicable predicates filter the range-partitioned table of the database before full application of the predicate to exclude data partitions based on the partially applicable predicate.

2. The method according to claim 1, further comprising calculating a corresponding set of partial adjustments for the at least one combination of partially applicable predicates.

3. The method according to claim 1, wherein, the predicate pl is the most leading key column predicate and as the psel(pl) is the number of qualified partitions after applying the predicate pl divided by the total number of partitions.

4. The method according to claim 3, wherein the partial selectivities are specified as:

$$psel(pt) = psel(p1, \ldots, pt)/(psel(p1) * \ldots * psel(pt-1))$$
$$= psel(p1, \ldots, pt)/psel(p1, \ldots, pt-1).$$

5. The method according to claim 1, further comprising:

computing an expected value, cc(B|A), of the number of rows per partition after a first predicate has been partially applied;

computing boundary values of cc(B|A), $cc(B|A)_{min}$ and $cc(B|A)_{max}$;

determining whether or not the expected value of cc(B|A), is within the boundary values;

choosing one of the two boundary values $cc(B|A)_{min}$ and $cc(B|A)_{max}$ to replace cc(B|A) if cc(B|A) is outside of the boundary values;

choosing the computed cc(B|A) if cc(B|A) is within the boundary values; and computing a partial selectivity corresponding to cc(B|A) as one over the value of cc(B|A).

6. The method according to claim 5, wherein:

$$cc(B|A)=cc(B)*(1-(1-1/p)(cc(A,B)/cc(B)))$$

wherein p is the number of partitions with distinct values of A and B is a non leading column.

7. The method according to claim 5, wherein:

$$cc(B|A)_{min}=cc(A,B)/cc(A); \text{ and}$$

$$cc(B|A)_{max}=\text{MIN}[cc(B), cc(A,B)/p)].$$

8. The method according to claim 5, wherein choosing one of the two boundary values $cc(B|A)_{min}$ and $cc(B|A)_{max}$ to replace cc(B|A) includes choosing the boundary value closest to the computed value of cc(B|A).

9. The method according to claim 1 further comprising identifying partially applicable predicates as those predicates that are used to partition the range-partitioned table and not used to define an index for the range-partitioned table.

* * * * *